United States Patent [19]

Testolini

[11] 4,360,004
[45] Nov. 23, 1982

[54] FLOATING SOLAR COLLECTOR

[76] Inventor: Giovanni Testolini, via Testolini, 14, Meano (Belluno), Italy

[21] Appl. No.: 131,364

[22] Filed: Mar. 18, 1980

[30] Foreign Application Priority Data

Mar. 29, 1979 [IT] Italy ................................ 2502 A/79

[51] Int. Cl.³ .............................................. F24J 3/02
[52] U.S. Cl. .................................. 126/415; 60/641.15
[58] Field of Search ............... 126/415, 416; 60/641.8, 60/641.15

[56] References Cited
U.S. PATENT DOCUMENTS 4,146,015 3/1979 Acker .................................. 126/415

FOREIGN PATENT DOCUMENTS 2315067 1/1977 Fed. Rep. of Germany ...... 126/415
52-8540 1/1977 Japan .................................... 126/415

Primary Examiner—Allen M. Ostrager
Attorney, Agent, or Firm—Michael J. Striker

[57] ABSTRACT

Utilization of solar energy by the production of steam within a cavity created between the surface of a sheet of water and a floating pontoon, the heat collected by a solar energy collector, placed on top of the pontoon, being transferred to the water itself by means of a heat exchanger, the solar energy collector being formed of a number of fixed transparent solid pieces each one comprising a black absorbing surface into which the sun's rays, refracted by the upper external surface and reflected inwards by the lateral surfaces, are concentrated.

16 Claims, 2 Drawing Figures

FLOATING SOLAR COLLECTOR

BACKGROUND OF THE INVENTION

The various devices and types of equipment for the concentration, accumulation and utilization of solar energy are by now well known, as is also the fact that, among other things, solar energy possesses the following two disadvantages:

low concentration of energy per surface unit receiving rays;

the varying amount of sunshine during the day and during the year.

It is therefore necessary to find a practical method of accumulating the solar energy collected in order to have it available at all times irrespective of when the sun is actually shining.

The various attempts to solve the problem have turned out to be somewhat ineffective either because of the low output achieved or because of the cost of the equipment needed being disproportionate to the results obtained.

Generally speaking, as the equipment capable of collecting this natural energy (enormous but highly dispersed) has to be in proportion to the very large size of the "structures" and natural forces, it is conditioned by this necessity and, as already mentioned, the amount of energy collected is not sufficient to balance the outlay and effort involved. The apparatus of the present invention solves these problems as will be described here below.

SUMMARY OF THE INVENTION

The invention envisages production of steam in the cavity between the surface of the water of a reservoir, lake, sea or similar sheet of water, and the lower surface of a pontoon or something similar, on which a fixed solar energy collector is placed, supported by the water itself with the aid of floats. The sides of the pontoon, held in place by chains fixed into the floor of the lake or similar sheet of water, are vertical and extend downwards under the water thus protecting the cavity from external disturbance such as might be caused by waves.

The heat collected by the solar energy collector is transferred to a heat exchanger in contact with the superficial layer of the water by means of a conveyor fluid with a high boiling point, such as mineral oil and graphite, which moves along in a closed circuit inside a connecting pipe with or without a pump. The steam so produced is in turn piped into a tank of water placed at a level higher than that from which the water to fill it was taken, and there, by means of a condenser, is turned back into water.

It is proposed to generate mechanical or another type of energy either by direct use of steam pressure or by using the energy created by the raised position of the water obtained from the steam. This water is utilizable for the production of power when discharged into a turbine or similar apparatus as happens at hydro-electric power stations.

The solar energy collector is essentially constituted of a set of solids each one being transparent and fixed, and having an upper transparent surface and a lateral one which reflects inwards.

The sun's rays striking the upper surface, refracted by it and reflected by the other surfaces, become concentrated in a black absorbent collecting surface placed opposite to the upper surface and smaller than it. The degree of concentration of the rays is constituted by the ratio between the amplitude of the striking surface and that of the collecting surface.

The various solid pieces are placed alongside one another and partially overlapping so as to present both a total ray striking surface, the sum of the striking surfaces of all the solid pieces, and also a total heat collecting surface, the sum of the collecting surfaces of the various solid pieces.

The ray striking and captating surface is slightly convex or flat. This surface (or its base), the lower surfaces of the energy collector and of the pontoon supporting it, the active surface of the heat exchanger beneath the energy collector, are substantially flattish and parallel one to another and to the water in order to facilitate as far as possible the reciprocal "sun-water" effects in the most rational way, with the minimum bulk and at the minimum cost.

The outline of the upper captating surface of each solid piece forming the energy collector is parabolic. In the same way the outlines of the lateral surfaces of each solid piece, which fit above and below onto those of the other overlying or underlying solid pieces, are parabolic. The features and the aims of the invention will be made even clearer by the constructional examples shown in the diagrammatic drawings.

DETAIL DESCRIPTION OF THE PREFERRED EMBODIMENTS

Figure 1:
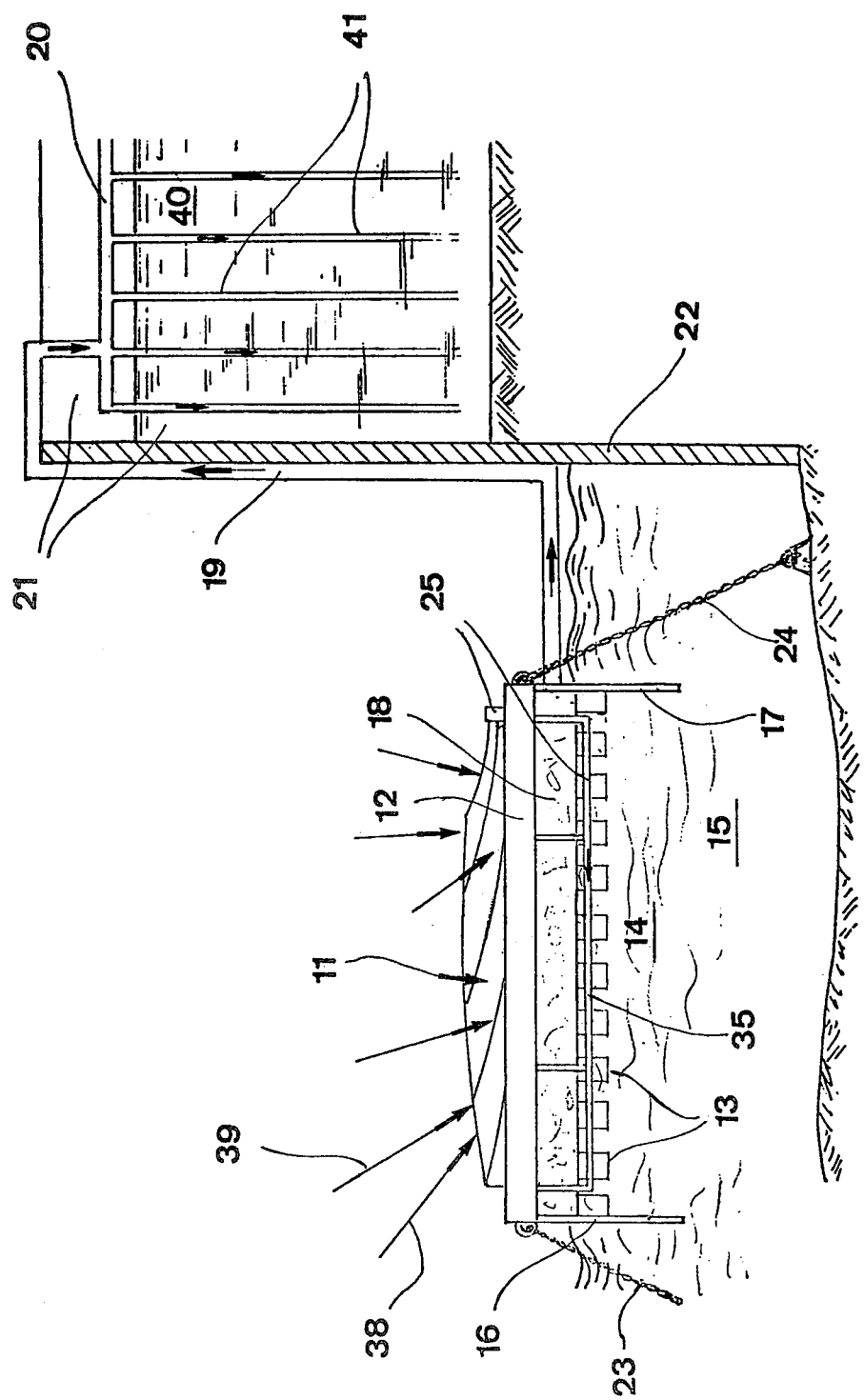
FIG. 1 is an overall diagrammatic view of the system.
Figure 2:
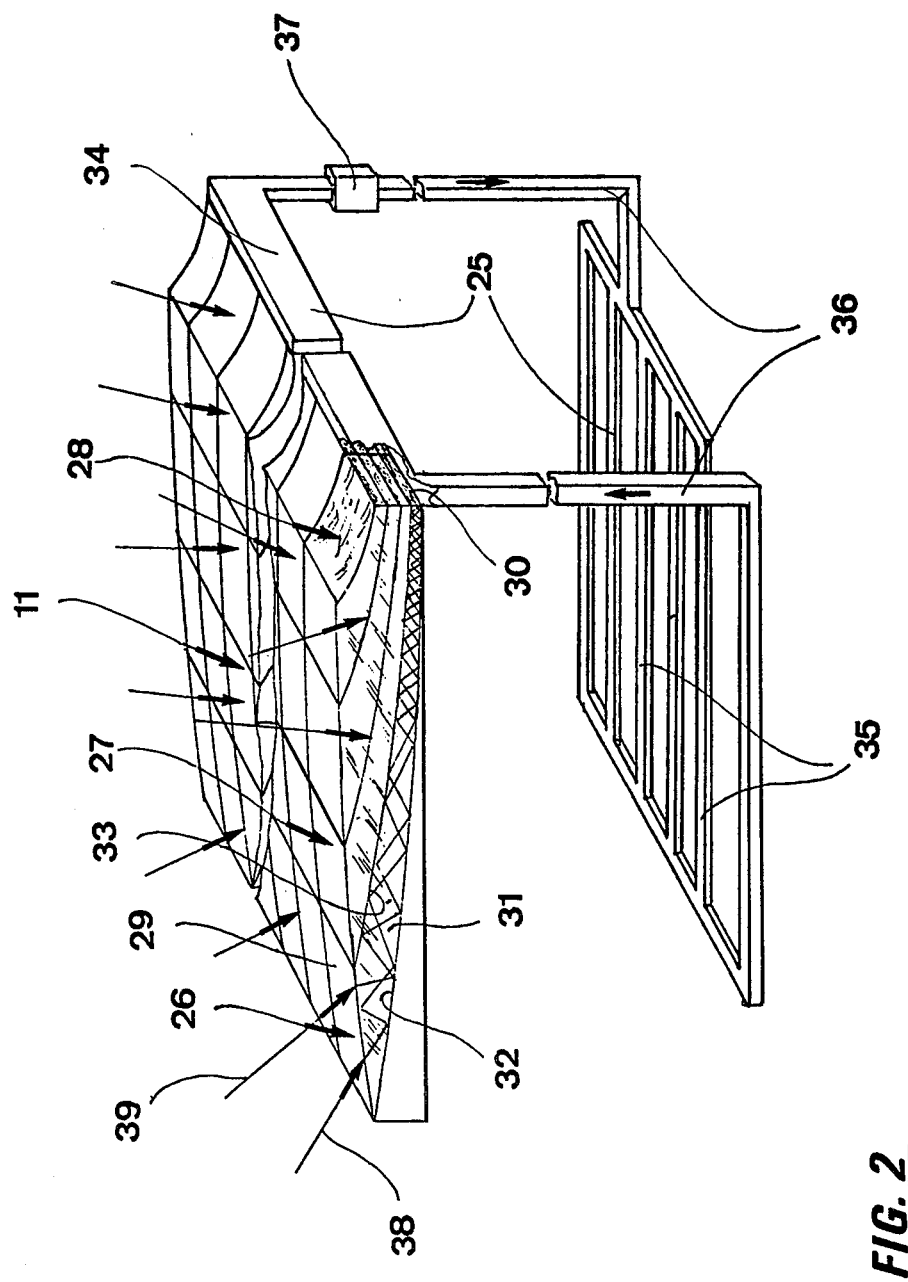
FIG. 2 is a detail view of the solar energy collector.

The solar energy collector (11) is housed on the pontoon (12) supported, with the aid of floats (13), by the water (14) of the lake or reservoir etc. (15), the pontoon being anchored to the bottom by chains (23) and (24). The surrounding sides (16) and (17) continue around the pontoon forming a cavity (18) between it and the surface of the water. A pipe (19) connects the cavity (18) with the condenser (20) placed inside a tank (21)—with surrounding side-walls (22)—situated at a level higher than that of water (14). The heat exchanger (25) forming part of the solar energy collector, includes a tubular grill (35) immersed just below the surface of water (14). The solar energy collector (11) (FIG. 2) is formed of a number of solid pieces (26),(27) and (28). Like (29) the surface of each piece is parabolic in outline and transparent, the opposite surface (30) of the solid piece is flat, smaller and blackened; the lateral surfaces like (31) are flat, parallel and silvered, and the opposite sides like (32) and (33) have parabolic outlines, are silvered and therefore reflecting. The heat exchanger (25) consists of a chamber (34) fitted up against the surfaces (30), and of a tubular grating (35) connected to the chamber (34) by the pipes (36) served by a circulation pump (37). Mineral oil mixed with graphite powder circulates in the heat exchanger. The sun's rays, coming from any direction denoted by arrows (38) and (39), strike the surfaces of the solid pieces such as (29), are refracted and are therefore reflected inwards by surfaces like (31), (32), (33) and become concentrated on the facets like the smaller, blackened surfaces (30) of the surfaces (29). These black facets absorb the sun's rays and emit highly concentrated heat rays.

The heat passed into the chamber (34) and to the fluid is transferred to the radiating grill (35). In turn this grill heats the superficial layer of the water (14) turning it into steam. Through pipe (19) this steam reaches the condenser (20) with grating (41) and is turned back into water (40) which fills up the tank (21). The water in the tank being at a higher level than that in the lake or reservoir (15) can be made to fall and create energy.

The steam produced inside the cavity (18) can be used, directly if required, to produce mechanical energy by exploiting its pressure.

This method may be summed up as one which rationally exploits natural phenomena, like that of water evaporation, more or less in their normal surroundings, adopting comparable dimensions and forces, without excessive cost, achieving a high concentration of solar energy and providing for its accumulation for utilization at any time of the year.

As the applications of the invention are here described merely to exemplify its use but not limiting it to these, it is understood that any equivalent application of the inventive concepts here set forth, and any product created and/or operating in accordance with the characteristics of the invention, will be included in its field of application.

I claim:

1. An apparatus for receiving, concentrating, accumulating and utilizing solar energy, to be located on a surface of water of a natural or of an artificial water source subject to sun rays, comprising a pontoon placed on the surface of water, said pontoon having an upper surface, a lower surface and vertical sides extending downwards into water; a solar energy collector positioned on said upper surface of the pontoon, said lower surface being spaced from the surface of water so that a cavity is formed between the surface of water and said lower surface and said vertical sides; and a heat exchanger located below the water surface and adapted to produce steam in said cavity, said steam being obtained from the action of thermal energy received by said solar energy collector from sun rays and passed to said heat exchanger which transfers the thermal energy to the layer of water above the heat exchanger.

2. The apparatus of claim 1, wherein said pontoon is held on the surface of water by water itself and assisted by floats.

3. The apparatus of claim 2, wherein at least one additional heat exchanger is provided which is fitted to said solar energy collector and connected to said first mentioned heat exchanger in a closed circuit containing a conveying fluid having a high boiling point, heat received from said solar energy collector passing into said first mentioned heat exchanger through said additional heat exchanger.

4. The apparatus of claim 3, wherein said conveying fluid includes mineral oil mixed with graphite powder.

5. The apparatus of claim 3, wherein said closed circuit includes pipe means.

6. The apparatus of claim 5, wherein said closed circuit further includes a pump.

7. The apparatus of claim 3, including a container filled with water and placed higher in relation to the surface of water of said source, said container being connected to said cavity with a pipe, and a condenser in communication with said container, the steam from said cavity passing through said pipe into said container and being then turned back into water by said condenser.

8. The apparatus of claim 7, wherein said solar energy collector includes a set of fixed solid pieces each being transparent and having an upper transparent surface on which the sun rays strike, lateral reflecting surfaces and a ray collecting surface, the ray collecting surface being smaller than said upper transparent surface.

9. The apparatus of claim 8, wherein said ray collecting surface is black and absorbent and capable of emitting heat radiations.

10. The apparatus of claim 9, wherein the sun rays reflected by the upper surfaces of said solid pieces and reflected by said lateral surfaces become concentrated in said ray collecting surfaces, the degree of ray concentration being approximately equivalent to a ratio between a size of said upper transparent surface and said ray collecting surface.

11. The apparatus of claim 10, wherein said solid pieces are placed side by side to each other so as to provide an overall ray-striking surface which is the sum of the individual adjacent ray-collecting surfaces.

12. The apparatus of claim 11, wherein said additional heat excharger brings said conveying fluid into contact with said overall ray-collecting surface.

13. The apparatus of claim 12, wherein said overall ray-striking surface is slightly convex.

14. The apparatus of claim 12, wherein said overall ray-striking surface is flat.

15. The apparatus of claim 12, wherein the lower surface of said pontoon and an active surface of said first mentioned heat exchanger are substantially flat and parallel one to another and to the surface of water.

16. The apparatus of claim 15, wherein said upper transparent surfaces and said lateral reflecting surfaces of the adjacent solid pieces are positioned in overlying and underlying relationship and each presents a parabolic outline while the surfaces of adjacent solid pieces placed side by side are flat and fit together laterally to thereby provide a complex capable of receiving most of the sun rays arriving from any direction, in a compact form so that an orientation of said solar energy collector is not required.

* * * * *